UNITED STATES PATENT OFFICE

HEINRICH BERTSCH, OF CHEMNITZ, GERMANY, ASSIGNOR TO H. TH. BÖHME A. G., OF CHEMNITZ, GERMANY, A CORPORATION OF GERMANY

WETTING AGENT

No Drawing. Application filed October 2, 1928, Serial No. 309,895, and in Germany October 11, 1927.

This invention comprises improvements in and relating to preparations for use as washing, wetting, emulsifying, solvent and similar agents, particularly in connection with textiles.

It is known that aromatic sulpho-acids of the type of propyl-naphthalene sulpho-acids that is sulpho-acids with two or more benzene rings having an alkyl side chain with three or more carbon atoms, have attained considerable importance in industry, for example as wetting agents, emulsifying agents and also as solubilizing or solvent agents.

These aromatic sulpho-acids, however, present a defect in their employment, especially in the textile industry, due to the fact that they do not possess the character or qualities of an oil and consequently cannot impart softness to the threads or fibres. In order to overcome this difficulty, Turkey-red oils have been mixed with the sodium salt of the above-described aromatic sulpho-acid and by that means an increased wetting capacity was imparted to the oils on the one hand and, on the other hand, a higher viscosity to the wetting medium. This has proved the necessity of combining the aromatic sulpho-acids, as such, with oils.

The solution of this problem has been frustrated, however, by reason of the fact that hitherto, it has not been possible to produce the oils of the same constancy and stability as are possessed by the aromatic sulpho-acids.

It has now been discovered that by treatment of higher molecular aliphatic unsaturated acids with sulphuric acid in the presence of aromatic acid chlorides or anhydrides, aliphatic sulpho-acids are produced which, in admixture with aromatic sulpho-acids of the kind referred to, combine in themselves the advantages of both these types of sulpho-acids and consequently exhibit a high degree of stability as compared with saponifying agents, besides possessing a high wetting ability, and also render the fibres or threads sufficiently soft.

As an example it is possible, by mixing equal parts of dipropyl-naphthalene sulpho-acid and the aliphatic sulpho-acid obtained from oleic acid, to obtain a preparation of exceptional wetting capacity and constancy, as compared with all saponifying media, and which is extremely suitable as a basis for washing and emulsifying media.

If desired the preparation may have an addition of carbons (hydrocarbons) or halogen hydrocarbons.

I claim:—

1. A preparation for use as a basis for washing, wetting, emulsifying, solvent and like media and especially suitable for textile treatment, comparing a mixture of an aromatic sulpho-acid with an aliphatic sulpho-acid derived from a fatty substance.

2. A preparation for use as a basis for washing, wetting, emulsifying, solvent and like media and especially suitable for the treatment of textiles, comprising a sulpho-acid of a multi-nuclear aromatic compound with aliphatic side chain having at least three carbon atoms, in admixture with a sulpho-acid obtained by treatment of an unsaturated higher molecular aliphatic acid with sulphuric acid in the presence of an anhydride or chloride of an organic acid.

3. A preparation for use as a basis for washing, wetting, emulsifying, solvent and like media and especially suitable for the treatment of textiles, comprising a sulpho-acid of a multi-nuclear aromatic compound with aliphatic side chain having at least three carbon atoms, in admixture with a sulpho-acid obtained by treatment of an unsaturated higher molecular aliphatic acid with sulphuric acid in the presence of an anhydride or chloride of an aromatic acid.

4. A preparation for use as a basis for washing, wetting, emulsifying solvent and like media and especially suitable for textile purposes, consisting of a mixture of dipropyl-naphthalene sulpho-acid with the aliphatic sulpho-acid obtained from oleic acid.

5. A preparation for use as a basis for washing, wetting, emulsifying, solvent and like media and especially suitable for textile purposes, consisting of a mixture of equal parts of dipropyl-naphthalene sulpho-acid and the aliphatic sulpho-acid obtained from oleic acid.

6. A treatment preparation particularly for use in the textile industry, comprising a mixture of an aromatic sulpho-acid with an aliphatic sulpho-acid derived from a fatty substance, and an addition of a hydrocarbon.

7. A treatment preparation particularly suitable for textile purposes, comprising a sulpho-acid of a multi-nuclear aromatic compound with aliphatic side chain having at least three carbon atoms, in admixture with a sulpho-acid obtained by treatment of an unsaturated higher molecular aliphatic acid with sulphuric acid in the presence of an anhydride or chloride of an organic acid, and an addition of a hydrocarbon.

8. A treatment preparation particularly intended for textile purposes, comprising a mixture of dipropyl-naphthalene sulpho-acid with the aliphatic sulpho-acid obtained from oleic acid, and an addition of a hydrocarbon.

9. A treatment preparation particularly for use in the textile industry, comprising a mixture of an aromatic sulpho-acid with an aliphatic sulpho-acid derived from a fatty substance, and an addition of halogen hydrocarbon.

10. A treatment preparation particularly suitable for textile purposes, comprising a sulpho-acid of a multi-nuclear aromatic compound with aliphatic side chain having at least three carbon atoms, in admixture with a sulpho-acid obtained by treatment of an unsaturated higher molecular aliphatic acid with sulphuric acid in the presence of an anhydride or chloride of an organic acid, and an addition of halogen hydrocarbon.

11. A treatment preparation particularly intended for textile purposes, comprising a mixture of dipropyl-naphthalene sulpho-acid with the aliphatic sulpho-acid obtained from oleic acid, and an addition of halogen hydrocarbon.

12. A treatment preparation particularly for use in the textile industry comprising a mixture of an aromatic sulpho-acid with a sulphonated higher molecular unsaturated aliphatic acid.

HEINRICH BERTSCH.